E. HAYES.
EXTENSIBLE AUTOMOBILE CONSTRUCTION.
APPLICATION FILED JAN. 10, 1916.
1,179,829.
Patented Apr. 18, 1916.
2 SHEETS—SHEET 1.
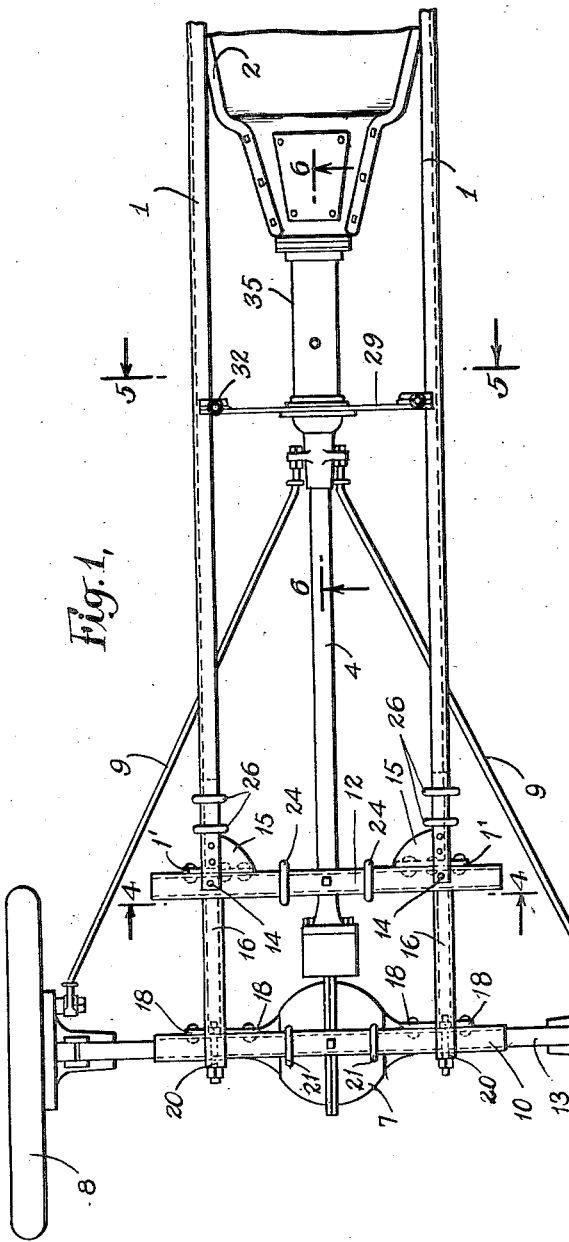
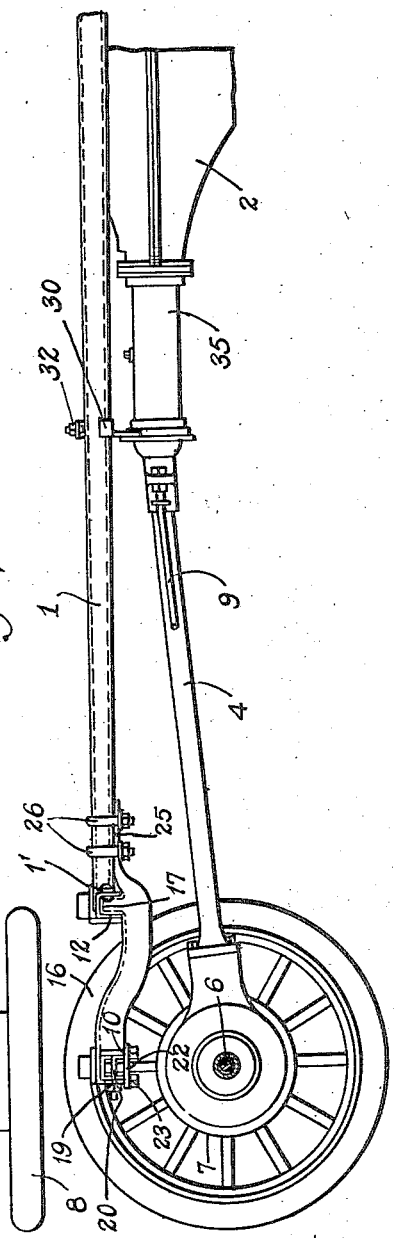
INVENTOR
Edward Hayes
BY
J. P. Edwards
ATTORNEYS E. HAYES.
EXTENSIBLE AUTOMOBILE CONSTRUCTION.
APPLICATION FILED JAN. 10, 1916.
1,179,829.
Patented Apr. 18, 1916.
2 SHEETS—SHEET 2.
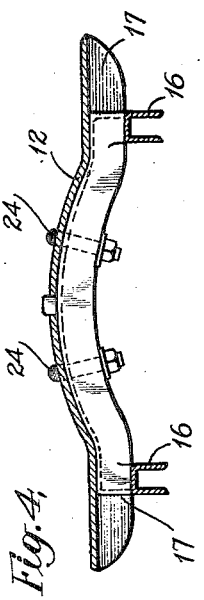
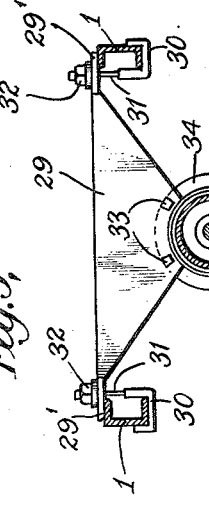
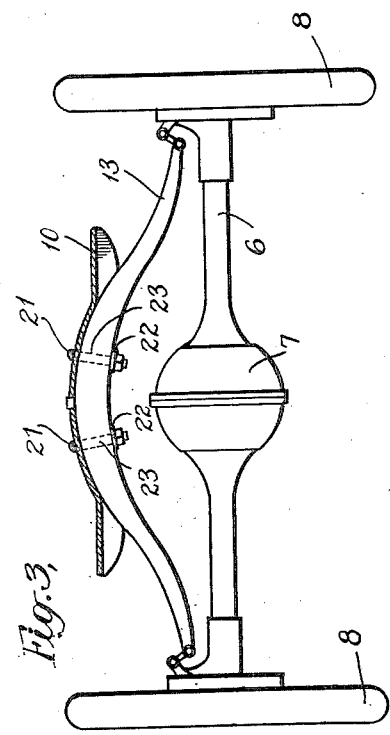
INVENTOR
Edward Hayes
BY
ATTORNEYS

UNITED STATES PATENT OFFICE.

EDWARD HAYES, OF NEW YORK, N. Y., ASSIGNOR TO HAYES DIEFENDERFER CO., INC., OF NEW YORK, N. Y., A CORPORATION OF NEW YORK.

EXTENSIBLE AUTOMOBILE CONSTRUCTION.

1,179,829.          Specification of Letters Patent.        Patented Apr. 18, 1916.

Original application filed June 28, 1915, Serial No. 36,621. Divided and this application filed January 10, 1916. Serial No. 71,152.

*To all whom it may concern:*

Be it known that I, EDWARD HAYES, a citizen of the United States, residing in the borough of Brooklyn, county of Kings, city and State of New York, have invented certain new and useful Improvements in Extensible Automobile Construction, of which the following is a specification.

The present application is a division of my application Serial No. 36,621, filed June 28, 1915, for automobile construction.

My invention relates to devices for lengthening the chassis and the driving connections of an automobile in a simple and effective manner, which will readily permit the reconversion of the chassis and driving connections into their original form, if desired, easily and conveniently.

My invention is chiefly intended for use when a touring car or other pleasure automobile is converted into a commercial vehicle, which is accomplished by removing the pleasure body and substituting a commercial body. In this case the commercial body in many cases will overhang the rear axle, so that the body is subjected to stresses and turning forces if it is adequately loaded at its rear portion. Accordingly, my invention provides means for lengthening the chassis an amount sufficient to prevent the commercial body from overhanging the rear axle, and for similarly lengthening the driving connections between the transmission and the differential gears. I accomplish this by removing the rear axle and rear spring, securing the spring to a specially prepared frame and clamping this frame to the rear of the original chassis, a transverse portion of the added frame preferably being received within the flanges of the original channel spring-holder. The torque tube and driving shaft of the original machine are used, being moved rearwardly to connect with the differential, the universal gear being moved rearwardly from its original position to a point somewhat to the rear of the transmission, where it is supported by an added cross member which is removably secured across the side members of the chassis. An added length of shafting is then inserted between the universal joint and the transmission, this shaft being of a length sufficient to compensate for the distance through which the rear axle and differential have been moved rearwardly from their original position. This added shaft may be formed with a squared plug at one end and a squared socket or recess at the other, whereby it is removably connected to the corresponding socket and plug of the transmission shaft and universal joint, the squared plug of the universal joint having been, in the pleasure car before the conversion thereof, inserted in the squared socket of the transmission. It is evident that the reconstruction described may be made quickly and securely, without the necessity of drilling holes in, or otherwise marring, the original chassis or parts, so that the vehicle may be changed back into its original form whenever desired without having been weakened or injured.

In the present application, I will claim the portion of my invention having to do with lengthening the chassis, by securing to the rear of the original chassis a specially prepared frame, to which the rear axle is secured, as stated. My said original application, Serial No. 36,621, includes claims to the means for lengthening the driving connections between the transmission and differential gears, when the chassis is extended, and combinations between such driving connection lengthening means and the extension means for the chassis, as described.

In order that a clearer understanding of my invention may be had, attention is hereby directed to the accompanying drawings forming part of this application and illustrating certain embodiments of my invention.

In the drawings, Figure 1 represents a top plan view of a reconstructed chassis, Fig. 2 is a side elevation of the same, Fig. 3 is a rear end view of the same, Figs. 4 and 5 are transverse vertical sections taken on lines 4—4 and 5—5 respectively of Fig. 1, Fig. 6 is an enlarged longitudinal section taken on line 6—6 of Fig. 1, and Fig. 7 is a partial rear plan view showing a modified chassis-extension means.

Referring to the drawings, the chassis of the original car comprises side members 1, 1 having downwardly extending and bottom flanges to form a channel-section, (Fig. 5) a transmission, the casing of which is shown at 2, suspended in the usual or any suitable manner, the torque tube 4 through which extends the driving shaft 5, the rear axle 6, differential, the casing of which is shown at 7, rear wheels 8, 8, stay rods 9, 9, spring-holder 10, rear spring 13, and universal joint 11. In the original chassis, before the lengthening of the same, the spring-holder 10 occupied the position shown in the drawings as occupied by the cross-member 12, the rear axle, differential, torque tube, driving shaft, universal and stay rods being correspondingly in a farther forward position than that shown, so that the driving shaft connected directly, through the universal, with the shaft 2' of the transmission.

To reconstruct the machine after the pleasure body has been removed, the spring-holder 10, together with the rear springs 13, axle 6 and connected parts, are removed from the end of the chassis as stated and a cross member 12, similar to the spring-holder 10, substituted for the latter at the rear end of the original chassis. Or spring 13, together with the axle, etc., could be removed from the original spring-holder and positioned in a similar one, the original spring-holder being left connected to the rear ends of side-members 1, 1, since members 10 and 12 are preferably duplicates. Members 10 and 12 are preferably of channel-section with downwardly extending flanges. If the original spring-holder, spring and axle are removed bodily, the duplicate channel cross member 12 may readily be substituted for the member 10 by bolting or otherwise securing the same to side members 1, 1 in the same manner in which the original spring-holding cross member was secured in place. As shown in the drawings, the webs or outer side portions of side members 1, 1 are bent outwardly at their rear ends, as shown at 1', 1', to form feet which are bolted to the adjacent flange of the cross member 12, the ends of the top flanges of side members 1, 1 being bolted to the horizontal web of cross member 12, as shown at 14, 14. Flanged gussets 15, 15 may also be bolted to the flanges of the side members and cross member 12 at the junctions thereof, these gussets being the same as were used at the same locations in the original chassis, and the bolt holes in the side members being the same originally provided for securing the rear transverse member in the same manner.

The chassis-extension means is preferably formed as a unitary structure comprising side members 16, 16 and a transverse portion 17 adapted to fit within the flanges of cross member 12. Side portions 16 and transverse portions 17 are preferably channel-sections similar to side members 1, 1 and cross member 12, the rearwardly extending side portions 16 being adapted to extend rearwardly in vertical alinement with side members 1, 1, when the transverse portion 17 is slipped within the cross member 12. The rearwardly extending portions 16 of the extension frame are connected, preferably removably, to the spring-holding cross member 10. In the device shown in the drawings, the side flanges of members 16 are bent at right angles at their rear ends, as shown at 18, 18, to form feet which are bolted to the adjacent flange of member 10, the web portions of members 16 extending over the web of member 10 and being flanged downwardly at the rear of the rear flange of member 10, as shown at 19, bolts 20, 20 being extended through flanges 19 and the flanges of member 10. The leaf spring 13 is secured within the flanges of member 10 by suitable means, such as the clamps 21 of U-shaped section, extending about member 10 and spring 13, and bars 22 secured thereto by bolts 23.

The transverse portion 17 of the extension frame is removably secured to cross member 12, preferably by clamps 24 bolted in position in the same manner as clamps 21 described. Preferably, the extension frame is provided with forwardly extending portions 25, in advance of transverse portion 17, as shown in Fig. 2, forwardly extending portions 25 bearing against the bottom flanges of side members 1, 1, and being removably secured thereto by means of clamps 26, 26 similar to clamps 21 and 24 described above. A modification of the above is shown in Fig. 7 in which transverse portion 17 of the extension frame is provided with forwardly extending portions 25', 25', which, instead of being in vertical alinement with rearwardly extending portion 16, 16, extend forwardly and outwardly at an angle from the intermediate portion of transverse member 17, the forward ends of extensions 25' being flanged, as shown at 27, 27, to contact with the inner surfaces of the webs and flanges of side members 1, 1, to which they are secured by clamps 26', 26'.

The chassis-extension frame may be made as a casting or may be formed of sheet-metal, pressed to shape, and the several portions of the construction welded or otherwise suitably secured together. The rear portions of members 16, above the member 10 should be in horizontal alinement with the upper surfaces of side members 1, 1 to support the body of the vehicle which may be secured upon the extended chassis in any suitable manner.

In order to lengthen the driving connection between the transmission and the differential gears, I move the universal joint, drive shaft and torque tubes rearwardly, as stated, and insert a short additional shaft 28 between the universal joint and the transmission. This may be effectively accomplished in the following manner: A transverse member 29 is mounted in position across the side members 1, 1, this transverse member having flanges 29', 29' which rest on the upper surfaces of side members 1. Member 29 may be removably clamped in position by means of U-shaped clamping members 30 positioned about the channel frames 1 and having bolts or screw-threaded portions 31 with which coact nuts 32 to tighten the clamps. Bolts 33 are extended through the depending portion of member 29 into a flange 34 formed on or secured to one end of a sleeve 35, the other end of which is provided with a flange 36 bolted by bolts 37, 37, to the casing 2 of the transmission. Sleeve 35 is provided with a bearing sleeve 38, to receive one end of the shaft 28. Shaft 28 is provided with a squared end 39 which is inserted into a correspondingly squared opening or socket in the adjacent end of the shaft 2' of the transmission, the other end of shaft 28 being provided with a squared socket in which is inserted the correspondingly squared end 40 of the adjacent stub-shaft of the universal joint 11. The stub-shaft 41 of the universal joint at the opposite side of the same is provided with a squared socket in which is inserted the squared end 42 of the driving shaft 5. Shaft 28 is provided with a shoulder 43 adapted to bear against the end of the bearing sleeve 38 to prevent lengthwise movement of the shaft.

In arranging the car to take a commercial-body, it is only necessary to remove the squared end 40 of the universal joint from the socket in transmission shaft 2', move the driving parts rearwardly so that the driving shaft will be in position to be connected with the differential, insert the squared end 39 of shaft 28 in its socket in the transmission, the universal and the other end of shaft 28 being connected in the manner described and then secure the tube 35 in position as described. The parts may be readily disconnected if it is desired at any time to put the chassis in its original condition, no bolt holes having been drilled or other alterations made in the frame as originally provided.

It should be understood that my invention is not limited strictly to the exact details of construction shown in which my invention is illustrated as applied to a particular form of existing automobile construction, but that my invention includes a reasonable range of equivalents of the structures described and illustrated.

Having now particularly described my invention, what I claim and desire to protect by Letters Patent is as follows:—

1. In an automobile, the combination of side members of a chassis, a channeled cross member secured to the rear ends of said side members, chassis-extension means having a transverse portion extending within the flanges of said cross member and portions extending rearwardly therefrom in alinement with said side members, clamping means for removably securing said transverse portion and said channeled cross member together, a second cross member secured to the rear ends of said rearwardly extending portions, a rear axle, and a spring interposed between said axle and said second cross member, substantially as set forth.

2. In an automobile, the combination of a chassis having side members and a rear cross member having a downwardly extending flange, chassis-extension means having a transverse portion resting against the flange of said cross member, portions extending rearwardly therefrom in alinement with said side members and a downwardly flanged rear transverse portion connecting the rear ends of said rearwardly extending portions, clamping means for removably securing said first-named transverse portion and said cross member together, a leaf spring secured against the flange of the rear transverse portion of said chassis-extension means, and a rear axle connected to said spring, substantially as set forth.

3. In an automobile, the combination of a chassis having side members and a rear cross member, all having downwardly extending flanges, chassis-extension means having a transverse portion resting against the flange of said cross member, side portions extending rearwardly therefrom in alinement with said side members, and forward extensions resting against surfaces of said side members, clamping means for removably securing said transverse portion and said cross member, and said forward extensions and said side members, together, a rear axle, and means for resiliently connecting the rear ends of said rearwardly extending portions to said axle, substantially as set forth.

4. In an automobile, the combination of a chassis, chassis-extension means having portions extending rearwardly from the rear end of said chassis, portions alined with and contacting portions of said chassis, and a transverse portion secured to the rear ends of said rearwardly extending portions, clamping means for removably securing said contacting portions of the chassis-extension means and chassis together, a rear axle, and means for connecting said axle and the transverse portion of said extension means, substantially as set forth.

5. In an automobile, the combination of a chassis having side members and a flanged rear cross member, chassis-extension means having a transverse portion resting against the flange of said cross member, portions extending rearwardly therefrom and a rear transverse portion connecting the rear ends of said rearwardly-extending portions, means for securing said first-named transverse portion and said cross member together, a rear axle, and means for connecting said axle and the rear transverse portion of said chassis-extension means, substantially as set forth.

6. In an automobile, the combination of a chassis having side members and a rear cross member, all having downwardly extending flanges, chassis-extension means having a transverse portion resting against the flange of said cross member, side portions extending rearwardly therefrom, and forward extensions resting against surfaces of said side members, and means for removably securing said transverse portion and said cross member, and said forward extensions and said side members, together, substantially as set forth.

This specification signed and witnessed this 6th day of January, 1916.

EDWARD HAYES.

Witnesses:
A. J. DIEFENDERFER,
THEO. E. BELTS.